United States Patent
Egilmez et al.

(10) Patent No.: US 12,267,496 B2
(45) Date of Patent: Apr. 1, 2025

(54) INCREMENTAL TRANSFORM SET CONSTRUCTION AND TRANSFORM SIGNALING FOR VIDEO CODING

(71) Applicant: Apple Inc., Cupertino, CA (US)

(72) Inventors: Hilmi Enes Egilmez, Santa Clara, CA (US); Yunfei Zheng, Santa Clara, CA (US); Alican Nalci, Cupertino, CA (US); Yeqing Wu, Cupertino, CA (US); Yixin Du, Cupertino, CA (US); Guoxin Jin, San Diego, CA (US); Alexandros Tourapis, Los Gatos, CA (US); Jun Xin, San Jose, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 19 days.

(21) Appl. No.: 18/358,111

(22) Filed: Jul. 25, 2023

(65) Prior Publication Data
US 2024/0040120 A1  Feb. 1, 2024

Related U.S. Application Data

(60) Provisional application No. 63/392,944, filed on Jul. 28, 2022.

(51) Int. Cl.
*H04N 7/12* (2006.01)
*H04N 19/12* (2014.01)
(Continued)

(52) U.S. Cl.
CPC ........... *H04N 19/122* (2014.11); *H04N 19/12* (2014.11); *H04N 19/136* (2014.11);
(Continued)

(58) Field of Classification Search
CPC .................................................. H04N 19/12
See application file for complete search history.

(56) References Cited

U.S. PATENT DOCUMENTS

2023/0188738 A1   6/2023   Nalci et al.

FOREIGN PATENT DOCUMENTS

WO   2023/107452 A1   6/2023

OTHER PUBLICATIONS

T. Wiegand et al.; "Overview of the H.264/AVC Video Coding Standard"; IEEE Transactions on Circuits and Systems for Video Technology; vol. 13, No. 7, Jul. 2003; pp. 560-576.
(Continued)

*Primary Examiner* — Y Lee
(74) *Attorney, Agent, or Firm* — BakerHostetler

(57) ABSTRACT

Video coders and decoders perform transform coding and decoding on blocks of video content according to an adaptively selected transform type. The transform types are organized into a hierarchy of transform sets where each transform set includes a respective number of transforms and each higher-level transform set includes the transforms of each lower-level transform set within the hierarchy. The video coders and video decoders may exchange signaling that establishes a transform set context from which a transform set that was selected for coding given block(s) may be identified. The video coders and video decoders may exchange signaling that establishes a transform decoding context from which a transform that was selected from the
(Continued)

identified transform set to be used for decoding the transform unit. The block(s) may be coded and decoded by the selected transform.

37 Claims, 8 Drawing Sheets

(51) Int. Cl.
    *H04N 19/122*     (2014.01)
    *H04N 19/136*     (2014.01)
    *H04N 19/159*     (2014.01)
    *H04N 19/176*     (2014.01)
    *H04N 19/18*     (2014.01)
    *H04N 19/186*     (2014.01)
    *H04N 19/61*     (2014.01)
    *H04N 19/70*     (2014.01)

(52) U.S. Cl.
    CPC ......... *H04N 19/159* (2014.11); *H04N 19/176* (2014.11); *H04N 19/18* (2014.11); *H04N 19/186* (2014.11); *H04N 19/61* (2014.11); *H04N 19/70* (2014.11)

(56) References Cited

OTHER PUBLICATIONS

G. J. Sullivan; "Overview of the High Efficiency Video Coding (HEVC) Standard"; IEEE Transactions on Circuits and Systems for Video Technology vol. 22, No. 12, Dec. 2012; pp. 1649-1668.

Y. Chen et al.; An Overview of Core Coding Tools in the AV1 Video Codec; 5 pages.

B. Bross et al.; "Overview of the Versatile Video Coding (VVC) Standard and Its Applications"; IEEE Transactions on Circuits and Systems for Video Technology; vol. 31., No. 10; Oct. 2021; pp. 3736-3764.

H. E. Egilmez et al.; "Graph-Based Transforms for Video Coding"; IEEE Transactions on Image Processing, vol. 29; 2020; pp. 9330-9344.

H. E. Egilmez et al.; "Parametric Graph-Based Separable Transforms For Video Coding"; IEEE Xplore, ICIP; 2020; pp. 1306-1310.

X. Zhao et al.; "Transform Coding in the VVC Standard"; IEEE Transactions on Circuits and Systems for Video Technology; vol. 31, No. 10; Oct. 2021; pp. 3878-3890.

X. Zhao et al.; "Study On Coding Tools Beyond Av1"; 2021 IEEE International Conference on Multimedia and Expo (ICME), 2021; pp. 1-6.

100

200

300

$S_0$: default set
$S_1$: simple subset
$S_2$: optimized set (best gain)
$S_3$: all possible candidates

| tx_type | 0 | 1 | 2 | 3 | 4 | 5 | 6 | 7 |
|---|---|---|---|---|---|---|---|---|
| $m=0$ | 9 | 1 | 3 | 6 | 7 | 8 | 2 | 4 |
| $m=1$ | 3 | 1 | 9 | 2 | 4 | 8 | 7 | 6 |
| ⋮ | | | | | | | | |
| $m=M-1$ | 1 | 3 | 9 | 6 | 7 | 8 | 2 | 4 |

FIG. 10
1000

| tx_type | 0 | 1 | 2 | 3 | 4 | 5 | 6 | 7 |
|---|---|---|---|---|---|---|---|---|
| $m=0$ | 0 | 8 | 1 | 3 | 8 | 5 | 15 | 14 |
| $m=1$ | 0 | 9 | 3 | 11 | 13 | 5 | 10 | 7 |
| ⋮ | | | | | | | | |
| $m=M-1$ | 0 | 3 | 9 | 1 | 13 | 11 | 6 | 8 |

FIG. 11
1100

| | tx_type | 0 | 1 | 2 | 3 | 4 | 5 | 6 |
|---|---|---|---|---|---|---|---|---|
| $G_1$ | $m=0$ | 0 | 8 | 1 | 3 | 8 | 5 | 15 |
| | $m=1$ | 0 | 9 | 3 | 11 | 13 | 5 | 10 |
| $G_2$ | $m=2$ | 0 | 3 | 9 | 1 | 13 | 11 | 6 |
| | $m=3$ | 0 | 3 | 9 | 1 | 6 | 11 | 13 |

| tx_type | 0 | 1 | 2 | 3 | 4 | 5 | 6 | 7 |
|---|---|---|---|---|---|---|---|---|
| $m = 0$ | 0 | 8 | 1 | 3 | 8 | 5 | 15 | |
| $m = 1$ | 0 | 9 | 3 | 11 | 13 | | | |
| ⋮ | | | | | | | | |
| $m = M - 1$ | 0 | 3 | 9 | 1 | 13 | 11 | 6 | 8 |

| | cu_tx_type | | | tu_tx_type | | | | |
|---|---|---|---|---|---|---|---|---|
| | 0 | 1 | 2 | 0 | 1 | 2 | 3 | 4 |
| tx_type | 0 | 1 | 2 | 3 | 4 | 5 | 6 | 7 |
| $m = 0$ | 9 | 1 | 3 | 6 | 7 | 8 | 2 | 4 |
| $m = 1$ | 3 | 1 | 9 | 2 | 4 | 8 | 7 | 6 |
| ⋮ | | | | | | | | |
| $m = M - 1$ | 1 | 3 | 9 | 6 | 7 | 8 | 2 | 4 |

1400

1500

INCREMENTAL TRANSFORM SET CONSTRUCTION AND TRANSFORM SIGNALING FOR VIDEO CODING

CLAIM FOR PRIORITY

This application benefits from priority of U.S. application Ser. No. 63/392,944, entitled "Incremental Transform Set Construction and Transform Signaling for Video Coding," filed Jul. 28, 2022, the disclosure of which is incorporated herein in its entirety.

BACKGROUND

The present disclosure relates to encoding and decoding of image data and video data.

Transform coding is a fundamental compression technique adopted in many block-based image and video compression systems/standards, where block signals are predicted from a set of available (decoded) reference pixels. Then, the resulting residual block signals are transformed to decorrelate residual pixel values for effective compression. After prediction and transformation steps, a typical video encoder applies quantization and entropy coding to convert transform coefficients into a conformant stream of bits, while, at the decoder side, the decoded coefficients are inverse quantized and transformed to obtain residuals used for reconstructing a video/image with prediction.

FIG. 1 illustrates a typical encoder-decoder architecture comprised of prediction, transformation, quantization and entropy coding building blocks, existing in many state-of-the-art compression standards and technologies such as H.264/AVC, H.265/HEVC, AV1 and H.266/VVC. As shown in FIG. 1, at the encoder side, the input video/image x is predicted using p to calculate residual r, where the predictor p is derived from available (decoded) reference pixels in y (based on a reconstructed video/image $\hat{x}$ with delay corresponding to previously coded frames or neighboring blocks). The residual r is then transformed and quantized to generate quantized transform coefficients (c), which are input to the entropy encoder with other syntax elements (s). On the decoder side, the process at the encoder side is reversed so that, as the first step, an entropy decoding process decodes the bitstream to generate c and s identically. The generated c is inverse quantized (i.e., dequantized), and decoded residuals (in $\hat{r}$) are obtained after inverse transformation. Then, the reconstructed video/image signal ($\hat{x}$) is generated after prediction with p (obtained from decoded pixels).

FIG. 2 further presents an exemplary video encoder with more details on prediction, where each input frame is first split into coding blocks, called coding units (CUs) in HEVC and VVC and prediction units (PUs), also called macroblocks, in AV1. These coding blocks (CUs/PUs) may be further split into transform units (TUs). After this partitioning stage, the prediction is generally carried out by choosing one among multiple intra and inter prediction modes in order to exploit spatial and temporal redundancies between blocks, where the encoder can predict pixels of a current block from neighboring blocks (i.e., by using intra prediction tools) and/or from temporally different frames/blocks (i.e., using inter prediction/motion compensated prediction), or hybrid modes that use both inter and intra prediction. Thus, the residual blocks (corresponding to r in FIG. 1) are obtained by subtracting the predicted values from the block of interest, and the encoder then applies a transformation on the residual block to generate transform coefficients that are quantized before their entropy coding.

Although different coding standards (HEVC, AV1 and VVC) have adopted different sets of coding tools, their basic encoder implementations follow the approach shown in FIG. 2, where the coding configurations (e.g., modes, parameters and tools) are selected based on different criteria, such as by making use of rate-distortion (RD) or rate-distortion-complexity criteria among others.

Prior Art on Transform Designs

In many state-of-the-art compression systems, transformation is an integral part of the encoding and decoding process, where transforms provide compact representations for the signals of interest (e.g., residual block signals obtained after prediction) by capturing most of the information in a few transform coefficients. Thus, the resulting coefficients are often more efficient to compress in the transform domain, while a decoder can perform an inverse transformation to effectively recover the residual signals from the coded coefficients.

In several video coding standards and technologies predating HEVC, the discrete cosine transform of type-2 (DCT-2) had been widely adopted. Such standards commonly employed only a singular transform type (besides transform skip/identity mode). This transform was also usually applied in a separable manner to rows and columns of each residual block. The main problem of using a single block transform is the implicit assumption that all residual blocks share the same statistical properties. However, residual blocks can have very diverse statistical characteristics depending on the video content and the prediction mode. HEVC partially addresses this problem by allowing the use of the type-7 discrete sine transform (ADST or DST-7) in addition to the DCT-2 for small (i.e., 4×4) intra predicted blocks. VVC has achieved better coding gains by using multiple transforms where an encoder selects the best transform (e.g., according to a rate-distortion criterion) among multiple transform candidates (or transform types).

In order to improve coding performance, both AV1 and VVC support multiple transform candidates that are derived from different types of discrete trigonometric transforms (i.e., types of DCTs and discrete sine transforms (DSTs)) and the identity transform. Specifically, the multiple transform selection (MTS) tool in VVC consists of 5 transform candidates as shown in Table 1, where the traditional DCT-2 transform (2D-DCT) and 4 possible combinations of DST-7 (ADST) and DCT-8 (Flipped ADST) are supported as transform candidates. In addition to the MTS, VVC also includes the identity (transform skip) mode and a data-driven, non-separable transform (which is applied to low-frequency coefficients) called as the low-frequency non-separable transform (LFNST). On the other hand, AV1 supports up to 16 separable transform candidates, listed in Table 2, consisting of pairwise (horizontal/vertical) combinations of the DST, DCT, identity transform, and flipped versions of the DST and DCT. Thus, a pair of 1-D transforms applied horizontally and vertically defines a 2-D block transform used as a candidate. Applying DCT both vertically and horizontally leads to the traditional 2-D DCT (i.e., DCT_DCT in Table 2). When a DCT/DST is paired with the identity transform (e.g., V_DCT and H_DST), the DCT/DST is applied in one direction. On the other hand, the identity transform is applied in the other direction, which results in scaling the coefficients in that direction. For example (see Table 2), V_DCT corresponds to applying DCT vertically and scaling the coefficients horizontally, and H $DS_2^m$ applies $DS_2^m$ horizontally and the identity transform (scaling) is applied vertically. The current version of the AOM video model (AVM) software, which is under development for the next generation AOM video coding standard, supports the same set of separable transforms as in AV1, where the AVM introduces two additional normative changes to the transformation design:

Forward skip coding (F SC) applies a separate coefficient coding for the 2-D identity transform (IDTX) and moves IDTX signaling from the TU to the CU/PU level for intra coded blocks.

The intra secondary transform (IST) introduces data-driven non-separable transform candidates that are only applied to low-frequency coefficients if DCT_DCT or ADST_ADST is used as the primary (i.e., separable) transform for intra coded blocks. The design principle of the IST is similar to the LFSNT tool in VVC.

TABLE 1

Transform candidates in MTS tool of VVC standard defined by types of DCTs/DSTs applied in horizontal and vertical direction separably.

| MTS index | Horizontal | Vertical |
|---|---|---|
| 0 | DCT-2 | DCT-2 |
| 1 | DST-7 | DST-7 |
| 2 | DST-8 | DCT-8 |
| 3 | DST-7 | DCT-8 |
| 4 | DCT-8 | DCT-8 |

TABLE 2

Transform candidates AV1 defined by types of DCTs, DSTs and identity applied in horizontal and vertical direction separably.

| Candidates | Identifier in AV1 | Vertical | Horizontal |
|---|---|---|---|
| 0 | DCT_DCT | DCT | DCT |
| 1 | ADST_DCT | ADST | DCT |
| 2 | DCT_ADST | DCT | ADST |
| 3 | ADST_ADST | ADST | ADST |
| 4 | FLIPADST_DCT | Flipped ADST | DCT |
| 5 | DCT_FLIPADST | DCT | Flipped ADST |
| 6 | FLIPADST_FLIPADST | Flipped ADST | Flipped ADST |
| 7 | ADST_FLIPADST | ADST | Flipped ADST |
| 8 | FLIPADST_ADST | Flipped ADST | ADST |
| 9 | IDTX | Identity | Identity |
| 10 | V_DCT | DCT | Identity |
| 11 | H_DCT | Identity | DCT |
| 12 | V_ADST | ADST | Identity |
| 13 | H_ADST | Identity | ADST |
| 14 | V_FLIPADST | Flipped ADST | Identity |
| 15 | H_FLIPADST | Identity | Flipped ADST |

AV1 defines 6 sets of the separable transform candidates as shown in Table 3a. These sets are selected depending on (i) the prediction type (whether the block is intra or inter coded) and (ii) the block size configuration, defined as the minimum of the TU width and height. Table 3b demonstrates the association between transform sets, block sizes, and prediction type (intra/inter prediction) used for coding.

TABLE 3a

Transform sets defined in AV1

| Set name | Transforms candidates in sets | Number of candidates |
|---|---|---|
| SET_DCTONLY | {DCT_DCT} | 1 |
| SET_DCT_IDTX | {DCT_DCT, IDTX} | 2 |
| SET_DTT4_IDTX | {DCT_DCT, IDTX, DCT_ADST, ADST_DCT, ADST_ADST} | 5 |
| SET_DTT4_IDTX_1DDCT | {DCT_DCT, IDTX, DCT_ADST, ADST_DCT, ADST_ADST, V_DCT, H_DCT} | 7 |
| SET_DTT9_IDTX_1DDCT | SET_ALL16 - {V_ADST, H_ADST, V_FLIPADST, H_FLIPADST} | 12 |
| SET_ALL16 | All possible candidates | 16 |

TABLE 3b

Transform sets associated with intra/inter blocks for different size configurations (defined by minimum of TU width and TU height)

| min(width, height) | Intra | Inter |
|---|---|---|
| 4 | SET_DTT4_IDTX_1DDCT | SET_ALL16 |
| 8 | SET_DTT4_IDTX_1DDCT | SET_ALL16 |
| 16 | SET_DTT4_IDTX | SET_DTT9_IDTX_1DDCT |
| 32 | SET_DCTONLY | SET_DCT_IDTX |
| 64 | SET_DCTONLY | SET_DCTONLY |

BRIEF DESCRIPTION OF THE DRAWINGS

FIG. 9 illustrates an exemplary mapping of transform candidates and transform syntax elements according to embodiments of the present disclosure.

FIG. 10 illustrates another exemplary mapping of transform candidates and transform syntax elements according to embodiments of the present disclosure.

FIG. 11 illustrates exemplary use of groupings for entropy coding context derivation according to embodiments of the present disclosure.

FIG. 12 illustrates another exemplary mapping of transform candidates and transform syntax elements according to embodiments of the present disclosure.

FIG. 13 illustrates use of signaling for coded blocks according to embodiments of the present disclosure.

DETAILED DESCRIPTION

This disclosure presents various designs for the transformation process that can help (i) improve the compression efficiency and (ii) reduce software/hardware implementation complexity of a video/image coding system/standard. Although some examples and embodiments described below are built upon AV1/AVM specifications, the principles illustrated in those examples may be extended or applied to other image/video coding standards that support multiple transform candidates, including primary (e.g., separable transforms) and/or secondary (e.g., non-separable ISTs/LFNSTs) transforms.

In general, transform designs with multiple transform candidates (or transform types) may be defined by specifying combinations of the following three components:

Transform sets, where each set consists of one or more transform candidates,

Dependency rules, which are a collection of rules/conditions derived based on information available at the decoder for determining a transform set, and/or Transform signaling, which determines the transform candidate used in the coding process for a given set of transforms and/or dependency rules.

These concepts and various implementations thereof are described below.

Transform Set Construction

Video/image encoders and decoders (generally, "codecs") may support multiple transform candidates in order to better adapt to diverse block signal characteristics in videos/images.

Given a number of transform candidates supported in a codec (e.g., AV1 supports 16 separable transform candidates as shown in Tables 2 and 3), a codec may construct one or multiple transform sets. This disclosure introduces the concept of incremental transform set construction where a codec constructs transform sets by adding one or more transform candidates recursively to previously constructed set(s). Specifically, the set construction starts with a base transform set ($S_0$) consisting of an initial set of transform candidates (e.g., a subset of 16 different candidates in AV1), and the other transform sets are built by iteratively adding one or more transform candidates on top of previously constructed set or sets. In this way, these transform sets may form a hierarchy in which higher-level transform sets include and supplement the transforms that are assigned to the lower-level transform sets within the hierarchy.

Figure 1:
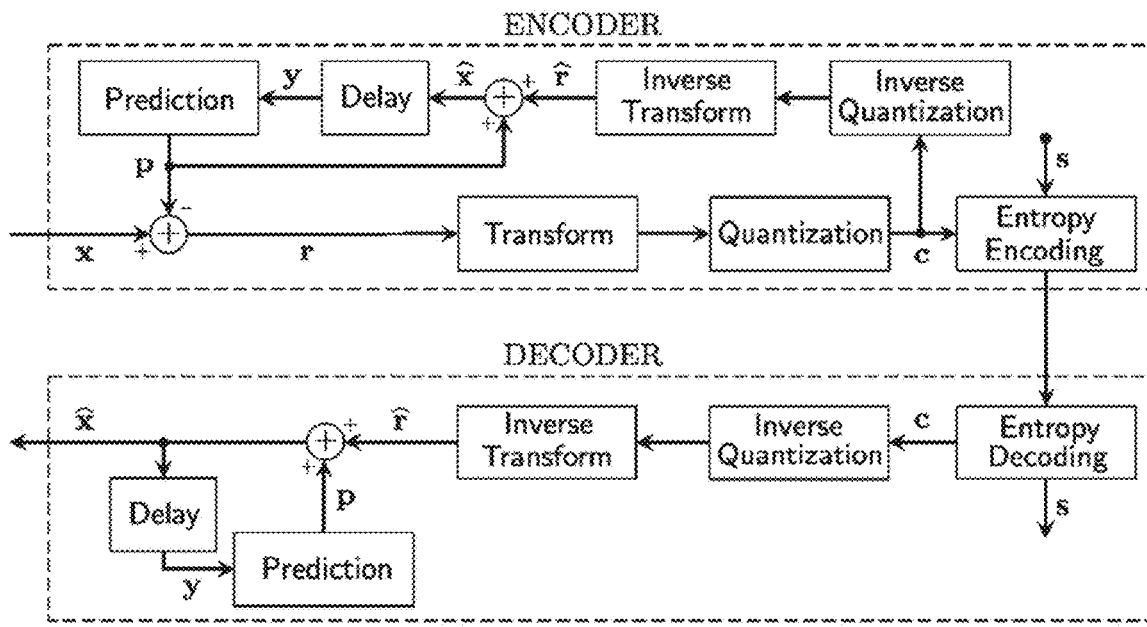
FIG. 1 illustrates a video encoder-decoder architecture suitable for use with the techniques proposed in the present disclosure.
Figure 2:
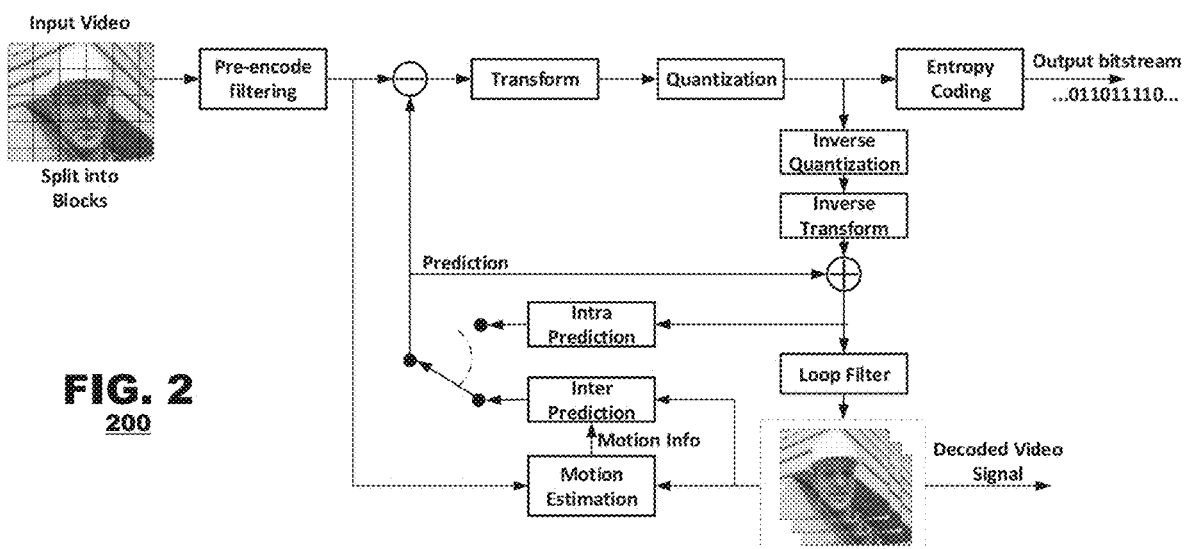
FIG. 2 presents an exemplary video encoder suitable for use with the techniques proposed in the present disclosure.
Figure 3:
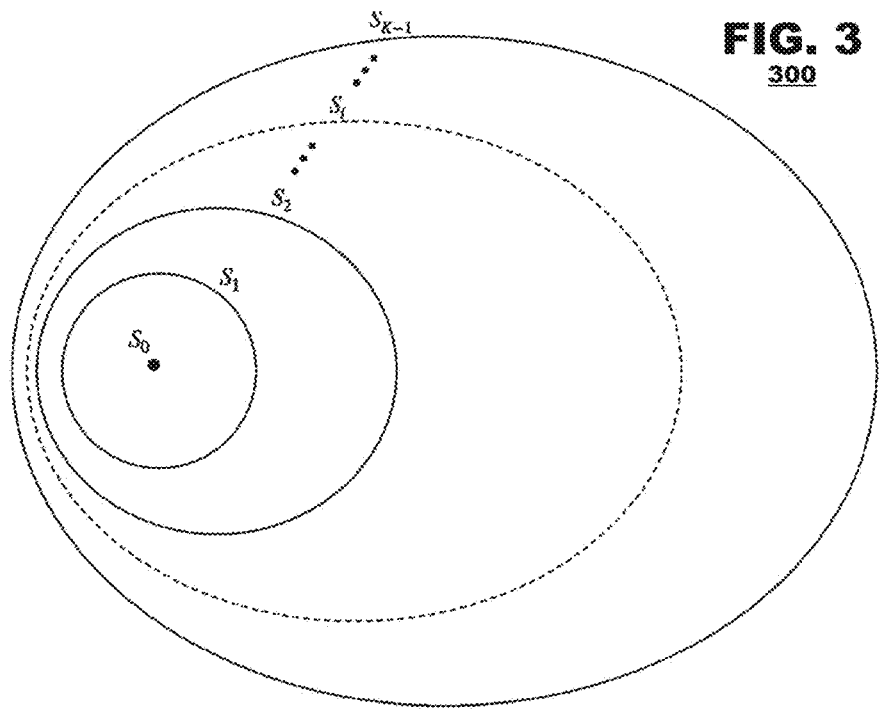
FIG. 3 illustrates construction of transform sets as may occur by a video encoder according to embodiments of the present disclosure.

FIG. 3 demonstrates a general, iterative construction of K sets ($S_0, S_1, \ldots, S_{K-1}$) where set $S_{i-1}$ is a subset of $S_i$ for i=1, 2, . . . , K−1. The set $S_{K-1}$ corresponds to the most complex transform set (being the highest in the hierarchy) as it includes the largest number of transform candidates from which an encoder may choose by performing the rate-distortion search. The set $S_0$ defines the least complex transform set (being the lowest in the hierarchy) as it contains the fewest transform candidates. Although transform set $S_{K-1}$ has the largest number of transform candidates (providing the most transform diversity), $S_{K-1}$ may incur a larger signaling overhead than the transform sets below it, and, therefore, it may not lead to the most coding efficiency. It may occur that a more efficient design can be achieved with a transform set having fewer transform candidates that may provide a better tradeoff between transform diversity and signaling overhead. Moreover, different compression scenarios (e.g., low-delay settings or screen content coding) often have different levels of transform complexity, so a simpler transform set may be desired to avoid redundant (excess) signaling in cases where encoders cannot perform RD search on a large number of transform candidates or where a targeted class of video content is simple to compress (i.e., a complex transform set may not be needed).

Figure 4:
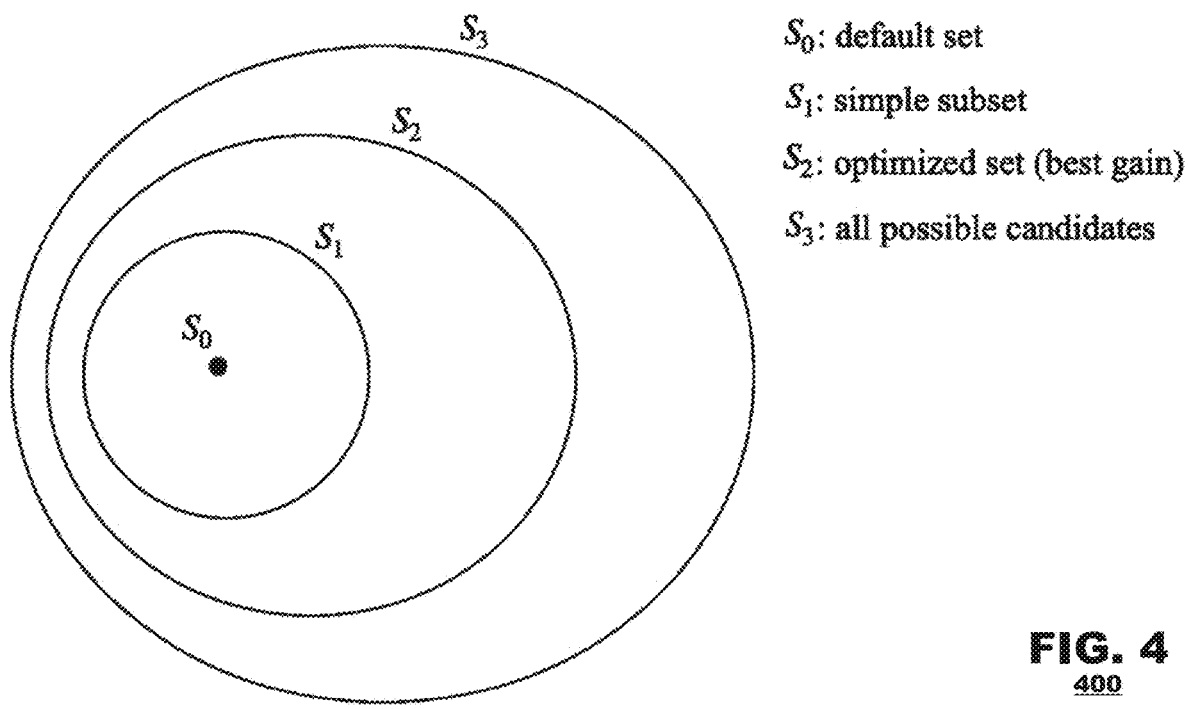
FIG. 4 illustrates construction of four exemplary transform sets as may occur by a video encoder according to embodiments of the present disclosure.

Having multiple and switchable transform sets allows codecs to be configured for different compression scenarios, applications, and class of signals (i.e., image/video content) by taking the transform diversity, signaling overhead, and complexity tradeoff into account. For example, FIG. 4 shows an example with 4 transform sets, where $S_0$ defines the default transform set as the most basic option. For example, $S_0$ may consist of a single transform candidate such as 2D-DCT (i.e., DCT_DCT in case of AV1 as shown in Table 2).

$S_3$ has all possible transform candidates supported in a codec (e.g., all 16 candidates in case of AV1) corresponding to the most complex setting.

$S_2$ corresponds to the set that provides the best coding gain by allowing sufficiently diverse transform candidates with a reasonable signaling overhead. In one example, $S_2$ may include 5 transform candidates including DCT_DCT, IDTX and ADST_ADST.

$S_1$ provides more flexibility than $S_0$ yet is not as complex as $S_2$. For example, in addition to the DCT_DCT in $S_0$, $S_1$ may include IDTX (identity transform) as the second transform candidate.

An encoder may signal the constructed transform sets $S_0$-$S_K$ (FIG. 3) at block-level or higher-level (tile, frame or sequence level) syntax element(s), or they may be inferred depending on information available at the decoder side according to certain dependency rules. After the transform set is determined in the encoder/decoder, the specific transform may be signaled if the set includes more than one candidate. In the following, techniques for dependency rules and signaling mechanisms are discussed, which may define and use other transform sets.

Dependency Rules For Transform Sets

In general, different transform sets may be constructed for different combinations of side information available at the decoder side, where each transform set can be associated with a certain combination. In other words, in a coding/decoding system with many transform sets defined for it, the side information may set a processing context in which one transform set is identified from a hierarchy of transform sets. For an efficient codec design, it can be beneficial to create dependency rules that provide (i) adaptivity and better support for different classes of residual block data, and (ii) configurability for different compression scenarios. However, in implementation, it may be advantageous to limit the dependency rules as these may incur additional processing delay due to parsing dependencies.

As more specific examples of dependency rules, different transform sets may be associated with one or more combinations of the following side information available at the decoder side of a video/image codec:

prediction type, which may include intra or inter prediction;

prediction modes, which may include intra or inter modes;

block size information, which may include width and/or height of a block (e.g., CU/PU or TU block);

block shape information, which may include ratio between width and height of a transform block (e.g., different transform sets for rectangular and square blocks);

transform block split level/depth (i.e., TU partitioning);

type of coded color channels (i.e., luma or chroma);

type of color channels such as luma (Y channel) or chroma (U and V);

type of color components such as Y, Cb, or Cr;

The color components may differ depending on the input video/image type, where input may be in high-dynamic range (HDR) and standard dynamic range (SDR) as well as use a different colorspace (e.g., BT.2020 or BT.709), representation (ICtCp, YCbCr or RGB) and chroma sampling (e.g., 4:2:0, 4:4:4 or 4:2:2). For example, the type of color component may be in YUV/YCbCr 4:2:0 format, or in RGB 4:4:4.

coded coefficient information such as last coefficient position, significance maps, coefficient sign pattern, number of coded coefficients, existence of DC/AC coefficients;

transform information of spatial or temporal neighboring coded blocks (i.e., transform set of neighboring blocks);

an auxiliary CU/PU level flag or index previously decoded prior to transform type decoding to indicate a transform set (e.g., such flag may indicate switching/constraining from $S_i$ to a smaller set $S_j$ such that j<i);

a high-level flag at the sequence parameter set (SPS), picture parameter set (PPS), tile level or CTU level to indicate a transform set; and/or previous decoded mode decisions at CU/PU levels such as intra block copy (IBC) mode, differential PCM mode to further constrain the transform sets used by subsequent TUs.

Figure 5A:
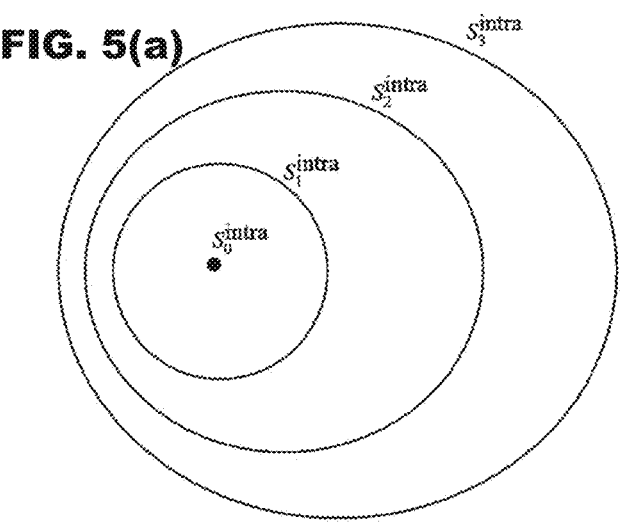
FIG. 5 illustrates exemplary construction of multiple transform set hierarchies, shown in FIGS. 5(a) and 5(b), respectively, according to embodiments of the present disclosure.
Figure 5B:
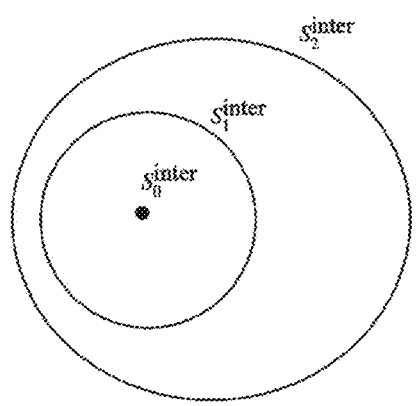

A codec may have one or more transform set hierarchies defined for it depending on the side information. FIG. 5 shows an example where different transform set hierarchies are developed separately for intra coded blocks (FIG. 5(a)) and inter coded blocks (FIG. 5(b)). Moreover, a codec may have separate hierarchies constructed for different prediction modes (e.g., intra modes) and/or different block size configurations (e.g., width and height of a transform block). Having separate hierarchies for different prediction type (intra/inter), mode and/or size configurations could help codecs to have a more flexible design that can potentially provide a better support for diverse class of signals (e.g., residual block signals). As shown in FIG. 5, for example, intra and inter blocks may have different transform set hierarchies defined for them to achieve better coding gains as residuals obtained from intra and inter blocks often have substantially different characteristics. Specifically, transform sets associated with intra and inter predicted blocks may all be different, or certain (predetermined) set/sets may be shared. For example, the default sets for intra and inter codec blocks may be the same (i.e., $S_0^{intra}=S_0^{inter}$). Moreover, the simplified sets indexed with i=1 may also be shared between intra and inter blocks such that $S_1^{intra}=S_1^{inter}$, while the remaining sets may be different (i.e., $S_i^{intra} \neq S_j^{inter}$ for i>1 and j>1).

Figure 6:
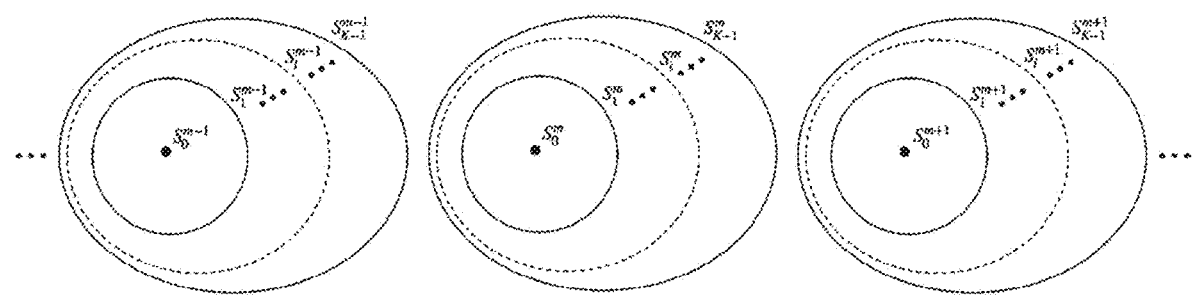
FIG. 6 illustrates exemplary construction of multiple transform set hierarchies according to embodiments of the present disclosure.

In one embodiment, in a unified design, illustrated in FIG. 6, the transform sets may be designed to have the same size across different mode or block size configurations (i.e., the number of transform candidates in $S_i^m$ are the same for all m), yet each set ($S_i^m$) across m may consist of different transform candidates. Having the same number of transform candidates for different m can be useful for the signaling mechanism since the codec does not require a different binarization/number of symbols for a different m value. In this case, only a remapping or sorting of the transform candidates could differ when signaling for a different configuration m. The next section discusses the transform signaling in detail.

Signaling of Transforms

Figure 7:
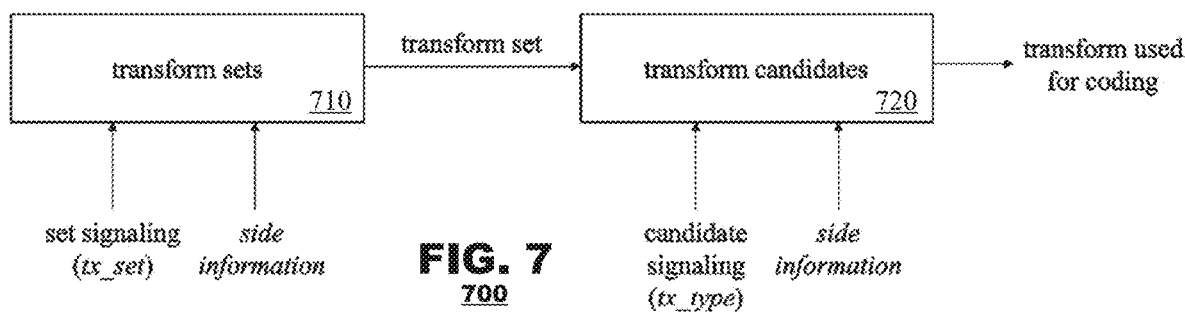
FIG. 7 illustrates a method of determining transform candidate/type for coding according to embodiments of the present disclosure.

In a codec supporting multiple transforms, where an encoder selects one among multiple transform candidates, a signaling mechanism may identify the transform candidate (or transform type) used for coding. In this disclosure, the transform candidate used for coding can generally be determined in two steps as illustrated in FIG. 7, where the transform set is determined first (box 710), and then the specific transform candidate (type) used for coding is identified (box 720). In each step, the codec may use the available side information and signaling for identifying the transform set, as well as the transform candidate used for coding.

Figure 8:
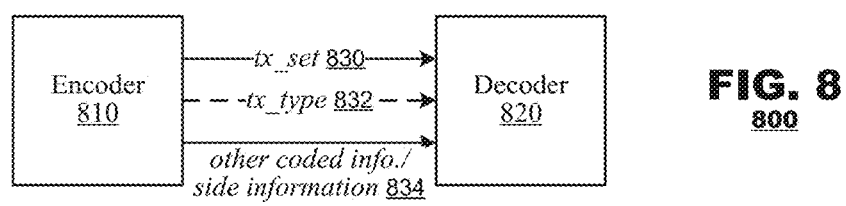
FIG. 8 illustrates communication of signaling information between an encoder and a decoder according to an embodiment of the present disclosure.

FIG. 8 illustrates communication of signaling information between an encoder 810 and a decoder 820 according to an embodiment of the present disclosure. In this instance, an encoder 810 may transmit tx_set 830, which identifies the transform sets developed by the encoder (bod 710). The encoder 810 also may transmit tx_type 832 in appropriate circumstances, which identifies a transform from among the transform sets that is used for coding a given block. As discussed, tx_set 830 and/or tx_type 832 may be defined with reference to side information 834 that develops a context for interpretation of the transmitted tx_set, tx_type values 830, 832; the side information 834 may be information sent prior to transmission of the tx_set, tx_type values 830, 832 when transmitting other information for a coding session between the encoder 810 and the decoder 820.

Examples of transform set identification/signaling 830 may include individual cases and/or combinations of the following:

- the transform set used by a codec may be determined only using dependency rules (e.g., using mode, block size information available at the decoder side) without any signaling;
- transform set may be signaled as a high level (e.g., at the frame, tile or sequence level) syntax element or as a block level (e.g., at the CTU, TU block, and/or CU/PU block) syntax element without dependencies on any side information;
- the transform set may be signaled at a high/block level to decide among multiple options defined by certain predefined dependency rules that may be based on side information;
- the transform set may be constructed and signaled at a high level based on previously coded frames statistics, i.e., the transform used in the past coded frames; and/or
- the transform set may be constructed and reordered at a block level based on previously coded blocks, i.e., the transform used in the past coded blocks.

After a codec determines the transform set, signaling allows codecs to determine the transform used for coding when the transform set has a plurality of transform candidates. When a transform set has a single transform candidate, no explicit signaling is required, and the transform candidate is inferred from the set implicitly. In this instance, tx_type 832 need not be transmitted from an encoder 810 to a decoder 820.

The transform candidate signaling may be carried out at the block level (e.g., CTU, CU/PU, or TU). The side information (i.e., dependency rules) may be used to create the list/ordering of the transform candidates for signaling. This listing/ordering process defines a mapping between actual transform candidates and transform syntax elements (i.e., the transform index denoted by tx_type 832 in FIG. 8). FIG. 9 shows an example where the same transform set of transform candidates based on Table 2 (i.e., the same 8 candidates in $S_2^m$ for all m) is used for different configurations denoted by m, yet the mapping between the tx_type syntax index and the transform candidate depends on m (e.g., based on prediction mode and/or block size, or any other side information available at the decoder). As a more general example, FIG. 10 shows a mapping between the transform index (tx_type) and the transform candidates in the case where different transform sets are used for different m (as depicted in FIG. 6). It is important to note that as long as the number of candidates is the same across m the same signaling approach may be used for different m. So, at the decoder side, the signaled tx_type syntax element is first decoded, and then the decoded tx_type is remapped based on one or a collection of mapping tables (e.g., depending on predetermined set of rules denoted by m=0, 1, . . . , M−1) to identify the transform used for coding.

The tx_type 832 may be signaled using bypass coding, where fixed-length coding or a binary-tree with prefix codes can be used. For more efficient compression, the tx_type 832 may have an entropy coding context, where context adaptive binary or multi-symbol arithmetic coding may be used as the entropy coder. As transform sets and mapping is used in the signaling, the number of entropy coding contexts per-symbol may also depend on the side information available at the decoder side. To achieve the best coding gains, separate entropy coding contexts may be defined for each configuration m, then the probabilities/CDFs are updated for each m. In order to reduce complexity, some configurations may be grouped so that entropy coding context probabilities/CDFs are updated per-group rather than being updated for each m. A grouping may be defined from a subset of configurations (i.e., subset of different m) as shown in FIG. 11, where four (M=4) configurations are grouped into two groups, $G_1$ and $G_2$. In one example, groups may be defined based on combinations of prediction modes and block sizes and may be different from the transform candidate mapping/reordering rules. For example, the same entropy coding context probabilities/CDFs may be used for small blocks (e.g., 4×4, 4×8 and 8×4) while for larger blocks (e.g., 8×8, 16×16, 4×16 and 16×4) another entropy coding context may be used in entropy coding of transform syntax (tx_type).

Specific Embodiments

Based on the core ideas described above, the following embodiments may help improve the coding performance and/or reduce complexity on a codec supporting multiple transform candidates.

Embodiments on high-level signaling of transform sets:

A high level flag, namely default_transform_set_flag, may be signaled at a sequence, picture, frame, or tile level to restrict a codec to only use default (base) set ($S_0$).

If the default_transform_set_flag is enabled, a codec can only use the default transform set $S_0$. Otherwise, if default_transform_set_flag is disabled, no high level restrictions are applied on other transform set related syntax elements.

If the default set ($S_0$) includes only one transform such as the 2-D DCT (i.e., $S_0=\{DCT\_DCT\}$), enabling default_transform_set_flag restricts the codec only to use this transform, e.g., the 2-D DCT, for any coded block without signaling any other transformation related syntax elements. In practice, default_transform_set_flag can be used for simple encoder designs where RD based transform selection is costly. Since enabling default_transform_set_flag disables any low-level (block-level) syntax elements, it removes the overhead of (redundant) signaling for the 2-D DCT at the block level.

In another example, the default transform set may be comprised of the DCT_DCT and IDTX (i.e., $S_0=\{DCT\_DCT, IDTX\}$). If default_transform_set_flag is enabled, the codec is then restricted to use either DCT_DCT or IDTX and one additional bit should be signaled at the block level to identify the transform candidate used for coding.

In another example, if a tile is expected to have screen content (e.g., if screen content tools are enabled), IDTX may be inferred as the default set for that tile if tile-level default_transform_set_flag is enabled. For tiles containing non-screen content, enabling default_transform_set_flag may restrict the codec to the use of DCT_DCT only.

In another example, enabling default_transform_set_flag may also disable all dependency rules derived from side information (e.g., prediction type, prediction mode and/or block size configurations). If the default set ($S_0$) includes only one transform such as 2-D DCT (i.e., $S_0=\{DCT\_DCT\}$), then DCT_DCT is used for all coded blocks irrespective of the side information.

A high level flag, namely simplified transform set flag, may be signaled at the sequence, frame, or tile level to restrict the codec to only use a simplified transform set (i.e., $S_1$ as shown in FIG. 4).

In one example, if simplified_transform_set_flag is enabled, then $S_1$ is used as the transform set for all coded blocks. The transform candidates in $S_1$ may be signaled by truncating the bits used for binary entropy coding. Similarly for multi-symbol arithmetic coding, the symbol length may be truncated to reduce the overhead of signaling the candidates in $S_1$ (e.g., if $S_1$ has 4 candidates, 4-symbol arithmetic coding is used).

For an encoder implementing both the default_transform_set_flag and simplified_transform_set_flag flags, if the default_transform_set_flag is enabled, the simplified_transform_set_flag is inferred as disabled, and the functionality defined by default_transform_set_flag is enabled and applied.

Enabling simplified_transform_set_flag may disable all dependency rules derived from side information (e.g., prediction type, prediction mode and/or block size configurations)

A high level flag, namely disable_dependency_rules_flag, may be used to disable all dependency rules defined to select transform sets. disable_dependency_rules_flag may only be signaled if both simplified_transform_set_flag and default_transform_set_flag are disabled.

A high level flag at the sequence, frame, or tile level may also be used to enable all possible transform candidates to be used and signaled at the block level (e.g., $S_3$ in FIG. 4 is used as the only transform set). In case of AV1, all 16 candidates may be allowed to be used and signaled irrespective of prediction type and block size (irrespective of the dependency shown in Table 3b).

The above defined high-level flags may apply to (i) luma coded blocks only, (ii) chroma codec block only, or (iii) both luma and chroma codec blocks. In another example, separate high-level flags for luma and chroma may be introduced.
Embodiments on transform designs:

In one embodiment, the following collection of transform sets can be constructed:
$S_0$={DCT_DCT}
$S_1$={DCT_DCT, IDTX, ADST_ADST}
$S_2^m$=set transform candidates for m=0, 1, M−1
$S_3$=set of all possible candidates (e.g., all 16 in Table 2)
where $S_0$, $S_1$, and $S_3$ are fixed across different side information configurations, and $S_2^m$ may generate the different set of candidates for different m (side information configurations).

In one example, the number of candidates in each $S_2^m$ may be equal to a fixed number N where N can be 4, 5, . . . 15. Since the set construction is incremental, $S_2^m$ includes the candidates in $S_1$, and further adds transform candidates (potentially different candidates) for different m. Since N is constant across different m, the entropy coding process for transform candidates can be the same for all m as the same binarization or the same number of symbols in a multi-symbol arithmetic coding can be used. After the tx_type is signaled, a mapping such as shown in FIG. 9 is needed to identify the actual transform used in coding a block.

In another example, the number of candidates within each $S_2^m$ may be different for different m, where $N_m=|S_2^m|$ denotes the number of candidates for each m, as shown in FIG. 12. Having a different number of candidates for different sets requires separate binarization/multi-symbol coding to normatively indicate efficient signaling. Alternatively, the number of candidates can be different only at the encoder side such that binarization and multi-symbol coding can be designed to support $N_{max}=\max(N_1, N_2, \ldots, N_{M-1})$ symbols and used for all m, whereas the encoder only performs RD optimization on N m candidates for different m with some redundancy in signaling.

In one example, $S_2^m$ can be used only for intra coded blocks where separate transform sets for different combinations of intra modes and block size information can be constructed.

For example, AV1 supports 13 intra modes that are namely DC_PRED, V_PRED, H_PRED, D45_PRED, D135_PRED, D113_PRED, D157_PRED, D203_PRED, D67_PRED, SMOOTH_PRED, SMOOTH V_PRED, SMOOTH H_PRED and PAETH_PRED, and separate transform sets can be created for each intra mode so that M=13 and $S_2^m$ is constructed for m =1, 2, 3, . . . , 12.

For example, AV1 supports 19 block size configurations with different weights and heights between 4 and 64 (including 4×4, 8×8, 16×16, 32×32, 64×64, 4×8, 8×4, 4×16, . . . ), and separate transform sets can be created for each block size so that M =19.

With different combinations of intra modes and block sizes, the number of side information configurations can be up to M=247=13×19 for each of which a separate transform set can be constructed.

In one example, the number of configurations may be reduced by grouping/classifying certain intra modes or block sizes. For example, intra modes can be grouped depending on neighboring modes (modes with similar angles) and separate transform sets can be constructed for each intra mode group. Different block size configurations may also be grouped and separate transform sets may be created for each configuration where
  the grouping used for context derivation in AV1 may be extended to be used for transform set construction, so that different block sizes are grouped according to the minimum of the block width and height.
  the grouping may also consider the shape of a block so that separate transform sets can be constructed for square blocks (e.g., 4×4, 8×8 and 16×16) and rectangular blocks (such as 4×8 and 16×4).

In one embodiment, the intra and inter blocks may use separate transform set constructions. As an example, the following transform sets may be generated:
$S_0=S_0^{intra}=S_0^{inter}$={DCT_DCT}
$S_1^{intra}$={DCT_DCT, ADST_ADST}
$S_1^{inter}$={DCT_DCT, IDTX, ADST_ADST}
$S_2^{m,intra}$=set transform candidates for m=0,1, . . . , $M^{intra}-1$
$S_2^{m,inter}$=set transform candidates for m=0,1, . . . , $M^{inter}-1$
$S_3=S_3^{intra}=S_3^{inter}$=set of all possible candidates (e.g., all 16 in Table 2)
where $S_0^{intra}$, $S_1^{intra}$, $S_2^{m,intra}$ and $S_3^{intra}$ are associated with intra blocks, and $S_0^{inter}$, $S_1^{inter}$, $S_2^{m,inter}$ and $S_3^{inter}$ are with inter blocks. The number of transform candidates in $S_2^{m,intra}$ intra and $S_2^{m,inter}$ are denoted by $M^{intra}$ and $M^{inter}$, respectively. This design is particularly useful for the current AVM design where FSC signals IDTX separately at the CU/PU level so that IDTX does not need to be signaled again as part of $S_1^{intra}$. However, IDTX is included in $S_2^{m,inter}$ since FSC does not change IDTX signaling for inter blocks.

In one example, FSC may be extended for inter blocks and can unify the IDTX signaling so that $S_1^{intra}$ and $S_1^{inter}$ can also be unified as a single set, i.e., $S_1=S_0^{intra}=S_1^{inter}$ {DCT_DCT, ADST_ADST}.

In one embodiment, a subset of transform candidates can be signaled at CU/PU level, and the remaining syntax elements can be signaled at TU level. FIG. 13 shows an example where the first 3 candidates are signaled at CU/PU level using cu_tx_type syntax, and the remaining transform indices are signaled at TU level using tu_tx_type. In this design, an additional flag may be signaled at CU/PU level to determine whether the codec should parse cu_tx_type or parse tu_tx_type and set transform types/candidates accordingly. Alternatively, cu_tx_type may be signaled and cu_tx_type=3 may indicate whether to further signal tu_tx_type. If cu_tx_type<3, this indicates that a transform type is signaled at CU/PU level, and if cu_tx_type is equal to 3, tu_tx_type is needed to be parsed for the codec to identify the transform candidate.

In one example, for all chroma coded blocks DCT_DCT transform may be used (i.e., corresponding to using the default set $S_0=\{DCT\_DCT\}$).

In one embodiment, block partitioning depth (CU/PU or TU level partitioning depth) can be used to infer the transform set used. For example, if the TU partition depth is larger than 0 (i.e., if CU/PU is partitioned into multiple TUs), the transform set or the specific transform type may be inferred. In one example, ADST_ADST may be inferred as the transform type when there is any TU-level partitioning and transform signaling may be skipped. In another example, the default set $S_0$ may be inferred when there is any TU-level split.

In one embodiment, a flag or index can be signaled at the coding tree unit (CTU), CU or PU level as cu_set_index ={0, 1, 2, . . . }. In cases where a CTU, CU, or PU contains multiple TUs, each TU may use a different transform type. Based on the signaled cu set index a decoder may use a specific set for the TUs residing under the same (CTU), CU, or PU. For example, if cu_set_index is equal to 1, then all TUs inside the (CTU), CU/PU may use the set $S_1$. If cu_set_index is signaled to be equal to k, a decoder may restrict the underlying TUs to use set $S_k$.

In one embodiment, a transform set $S_i$ may include non-primary transform candidates such as the secondary transform modes (e.g., IST modes in the AVM or LFNST modes in VVC) signaled in the coding specifications. Specifically, $S_i$ may include {DCT_DCT, DCT_DCT+secondary transform candidates} where "DCT_DCT+secondary transform candidates" refers to secondary transform candidates applied to low-frequency coefficients of DCT_DCT. In general, sets may include other transform types (e.g., data-driven and learned transforms) besides discrete trigonometric transforms such as DCTs/DSTs.

In one embodiment, a transform set may be selected based on historical data (statistics) obtained from previously coded block information. The transform selection may be carried out normatively so that both the encoder and the decoder collect historical data/statistics on previously coded block information and apply certain dependency rules based on the collected statistical information to select a transform set.

For example, if DCT_DCT is frequently selected in a previously coded frame/tile/CTU/SB, both encoder and decoder may switch to using the default set $S_0=\{DC\_DCT\}$ for the next frame/tile/CTU/SB. A predetermined threshold T may be applied to decide when to switch between sets. For example, if a previously coded frame/tile chose DCT_DCT in coding more than T=80% of the blocks, in the next frame/tile, both encoder and decoder switches to the default set $S_0=\{DCT\_DCT\}$ for coding books in the next frame/tile.

In another and more general example, both the encoder and the decoder may calculate statistics (e.g., frequency count) for a subset of all transform candidates. For example, if the transform set $S_i$ is selected more than a threshold T in a previously coded frame/tile/CTU, both the encoder and the decoder may switch to using transform set $S_i$ for the next frame/tile/CTU.

Historical data and statistics may also be used for ordering/remapping the transform candidates within a set. The transform candidates in a set ($S_i$) may be reordered depending on the frequency of the transform candidates selected in previously coded frames/tiles/CTUs. For example, if ADST_ADST and DCT_DCT are the most and second most selected transform candidates in $S_i$ respectively, then the transform signaling may apply reordering/remapping by following such information so that tx_type indexes 0 and 1 correspond to DCT_DCT and ADST_ADST, respectively.

A frame/tile level flag (or syntax elements) may be added to determine the transform set used for each frame/tile, and historical data (statistics) obtained from previously coded block information may be used as part of the encoder algorithm with a threshold determining which transform set to use for the next frame/tile. In this case, the decoder does not need to collect coded block statistics and can determine the transform set by signaling (i.e., by decoding frame level syntax elements for transform set selection).

Figure 14:
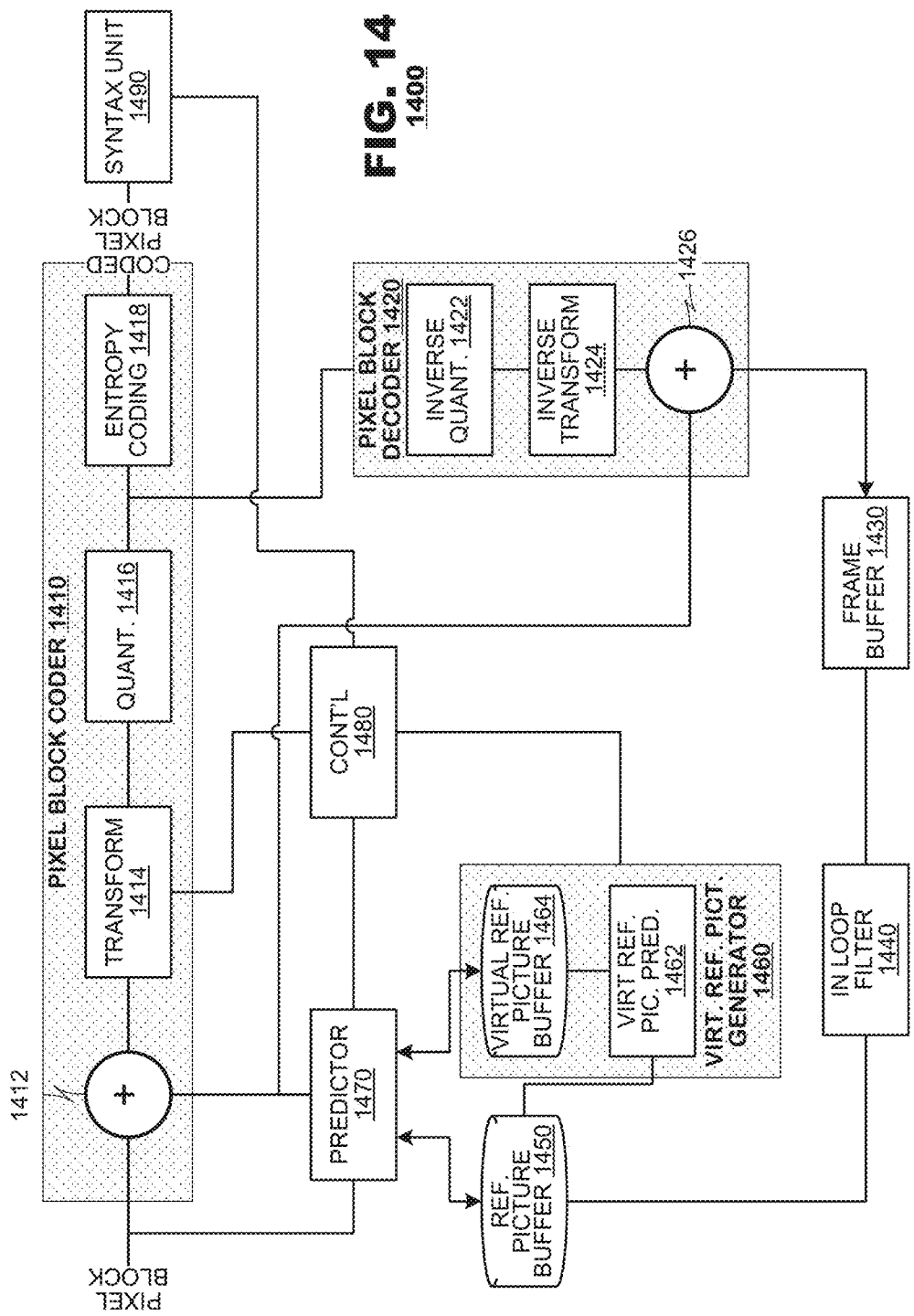
FIG. 14 is a block diagram of a video encoder according to embodiments of the present disclosure.

FIG. 14 is a functional block diagram of a coding system 1400 according to an aspect of the present disclosure. The system 1400 may include a coding block coder 1410, a coding block decoder 1420, a frame buffer 1430, an in loop filter system 1440, reference picture buffer 1450, a virtual reference picture generator 1460, a predictor 1470, a controller 1480, and a syntax unit 1490. The coding system 1400 may code input coding blocks differentially according to predictive techniques. Thus, a frame of video to be coded may be parsed into coding blocks, which the coding block encoder 1410 processes on a coding block-by-coding block basis. The coding block coder 1410 may present coded coding block data to the syntax unit 1490, which formats the coded coding block data into a transmission syntax that conforms to a governing coding protocol.

The coding block decoder 1420 may decode the coded coding block data, generating decoded coding block data therefrom. The frame buffer 1430 may generate reconstructed frame data from the decoded coding block data. The in-loop filter 1440 may perform one or more filtering operations on the reconstructed frame. For example, the in-loop filter 1440 may perform deblocking filtering, sample adaptive offset (SAO) filtering, adaptive loop filtering (ALF), maximum likelihood (ML) based filtering schemes, deringing, debanding, sharpening, resolution scaling, and the like. Filtered frames may be stored either in a reference picture buffer 1450 where it may be used as a source of prediction of later-received coding blocks.

The coding block coder 1410 may include a subtractor 1412, a transform unit 1414, a quantizer 1416, and an entropy coder 1418. The coding block coder 1410 may accept coding blocks of input data at the subtractor 1412. The subtractor 1412 may receive predicted coding blocks from the predictor 1470 and generate an array of pixel residuals therefrom representing a difference between the input coding block and the predicted coding block. The transform unit 1414 may apply a transform to the sample data output from the subtractor 1412, to convert data from the pixel domain to a domain of transform coefficients. In some scenarios (for example, when operating in high dynamic range) prior to transform unit 1414 and/or subtractor 1412, the input may be reshaped, or an adaptation scheme be applied to adjust to the content transfer characteristics. Such an adaption can be either a simple scaling, based on a re-mapping function, or a more sophisticated pixel manipulation technique. The quantizer 1416 may perform quantization of transform coefficients output by the transform unit 1414 according to a quantization parameter qp. The quantizer 1416 may apply either uniform or non-uniform quantization parameters; non-uniform quantization parameters may vary across predetermined locations of the block of coefficients output from the transform unit 1414. The entropy coder 1414 may reduce bandwidth of the output of the coefficient quantizer by coding the output, for example, by variable length code words or using a context adaptive binary arithmetic coder.

The transform unit 1414 may operate in a variety of transform modes as determined by the controller 1480. The controller 1480 may select one of the transforms described hereinabove according to the controller's determination of coding efficiencies that will be obtained from the selected transform. Once the transform to be used for coding is selected, the controller 1480 may determine whether it is necessary to signal its selection of the transform and, if so, how to signal such selection, using the techniques described hereinabove.

The quantizer 1416 may operate according to a quantization parameter qp that is determined by the controller 1480. Techniques for developing the quantization parameter are discussed hereinbelow. The controller 1480 may provide data to the syntax unit 1490 representing its quantization parameter selections.

The entropy coder 1418, as its name implies, may perform entropy coding of data output from the quantizer 1416. For example, the entropy coder 1418 may perform run length coding, Huffman coding, Golomb coding, Context Adaptive Binary Arithmetic Coding, and the like.

The coding block decoder 1420 may invert coding operations of the coding block coder 1410. For example, the coding block decoder 1420 may include a dequantizer 1422, an inverse transform unit 1424, and an adder 1426. In some scenarios (for example, when operating in high dynamic range) post to inverse transform unit 1424 and/or adder 1426, the input may be inverse reshaped or re-mapped typically according to a function that was applied at the encoder and content characteristics. The coding block decoder 1420 may take its input data from an output of the quantizer 1416. Although permissible, the coding block decoder 1420 need not perform entropy decoding of entropy-coded data since entropy coding is a lossless event. The dequantizer 1422 may invert operations of the quantizer 1416 of the coding block coder 1410. The dequantizer 1422 may perform uniform or non-uniform de-quantization as specified by the quantization parameter data qp. Similarly, the inverse transform unit 1424 may invert operations of the transform unit 1414. The dequantizer 1422 and the inverse transform unit 1424 may use the same quantization parameters qp and transform modes as their counterparts in the coding block coder 1410. Quantization operations likely will truncate data in various respects and, therefore, data recovered by the dequantizer 1422 likely will possess coding errors when compared to the data presented to the quantizer 1416 in the coding block coder 1410.

The adder 1426 may invert operations performed by the subtractor 1412. It may receive the same prediction coding block from the predictor 1470 that the subtractor 1412 used in generating residual signals. The adder 1426 may add the prediction coding block to reconstructed residual values output by the inverse transform unit 1424 and may output reconstructed coding block data.

As described, the frame buffer 1430 may assemble a reconstructed frame from the output of the coding block decoders 1420. The in-loop filter 1440 may perform various filtering operations on recovered coding block data. For example, the in-loop filter 1440 may include a deblocking filter, a sample adaptive offset ("SAO") filter, and/or other types of in loop filters (not shown). The reference picture buffer 1450 may store filtered frame data output by the in-loop filter 1440 for use in later prediction of other coding blocks.

The virtual reference picture generator 1460 may generate virtual reference frames. The virtual reference picture generator 1460 may include a virtual reference picture predictor 1462 and a virtual reference picture buffer 1464. The virtual reference picture predictor 1462 may generate the virtual reference frames from reference frames stored in the reference picture buffer 1450. The virtual reference picture buffer 1464 may store the virtual reference frames so generated for use in prediction by the predictor 1470.

Different types of prediction data are made available to the predictor 1470 for different prediction modes. For example, for an input coding block, intra prediction takes a prediction reference from decoded data of the same frame in which the input coding block is located. Thus, the reference frame store 1450 may store decoded coding block data of each frame as it is coded. For the same input coding block, inter prediction may take a prediction reference from previously coded and decoded frame(s) that are designated as reference frames. Thus, the reference frame store 1450 may store these decoded reference frames.

The predictor 1470 may supply prediction blocks to the coding block coder 1410 for use in generating residuals. The predictor 1470 may perform prediction search operations according to intra mode coding, and uni-predictive, bi-predictive, and/or multi-hypothesis inter mode coding. For intra mode coding, the predictor 1470 may search from among coding block data from the same frame as the coding block being coded that provides the closest match to the input coding block. For inter mode coding, the predictor 1470 may search from among coding block data of other previously coded frames stored in the reference picture buffer 1450 that provides a match to the input coding block. From among the predictions generated according to the various modes, the predictor 1470 may select a mode that achieves the lowest distortion when video is decoded given a target bitrate. Exceptions may arise when coding modes are selected to satisfy other policies to which the coding system 1400 adheres, such as satisfying a particular channel behavior, or supporting random access or data refresh policies.

When performing prediction searches within virtual reference frames stored in the virtual reference frame buffer 1464, the predictor 1470 may perform direct motion projection and temporal motion projection as described hereinabove.

The controller 1480 may control overall operation of the coding system 1400. The controller 1480 may select operational parameters for the coding block coder 1410 and the predictor 1470 based on analyses of input coding blocks and also external constraints, such as coding bitrate targets and other operational parameters. The controller 1480 also may select between different modes of operation by which the system may generate reference images and may include metadata identifying the modes selected for each portion of coded data.

During operation, the controller 1480 may revise operational parameters of the quantizer 1416 and the transform unit 1415 at different granularities of image data, either on a per coding block basis or on a larger granularity (for example, per frame, per slice, per largest coding unit ("LCU") or Coding Tree Unit (CTU), or another region). In an aspect, the quantization parameters may be revised on a per-pixel basis within a coded frame.

Additionally, as discussed, the controller 1480 may control operation of the in-loop filter 1450 and the prediction unit 1470. Such control may include, for the prediction unit 1470, mode selection (lambda, modes to be tested, search windows, distortion strategies, etc.), and, for the in-loop filter 1450, selection of filter parameters, reordering parameters, weighted prediction, etc.

Figure 15:
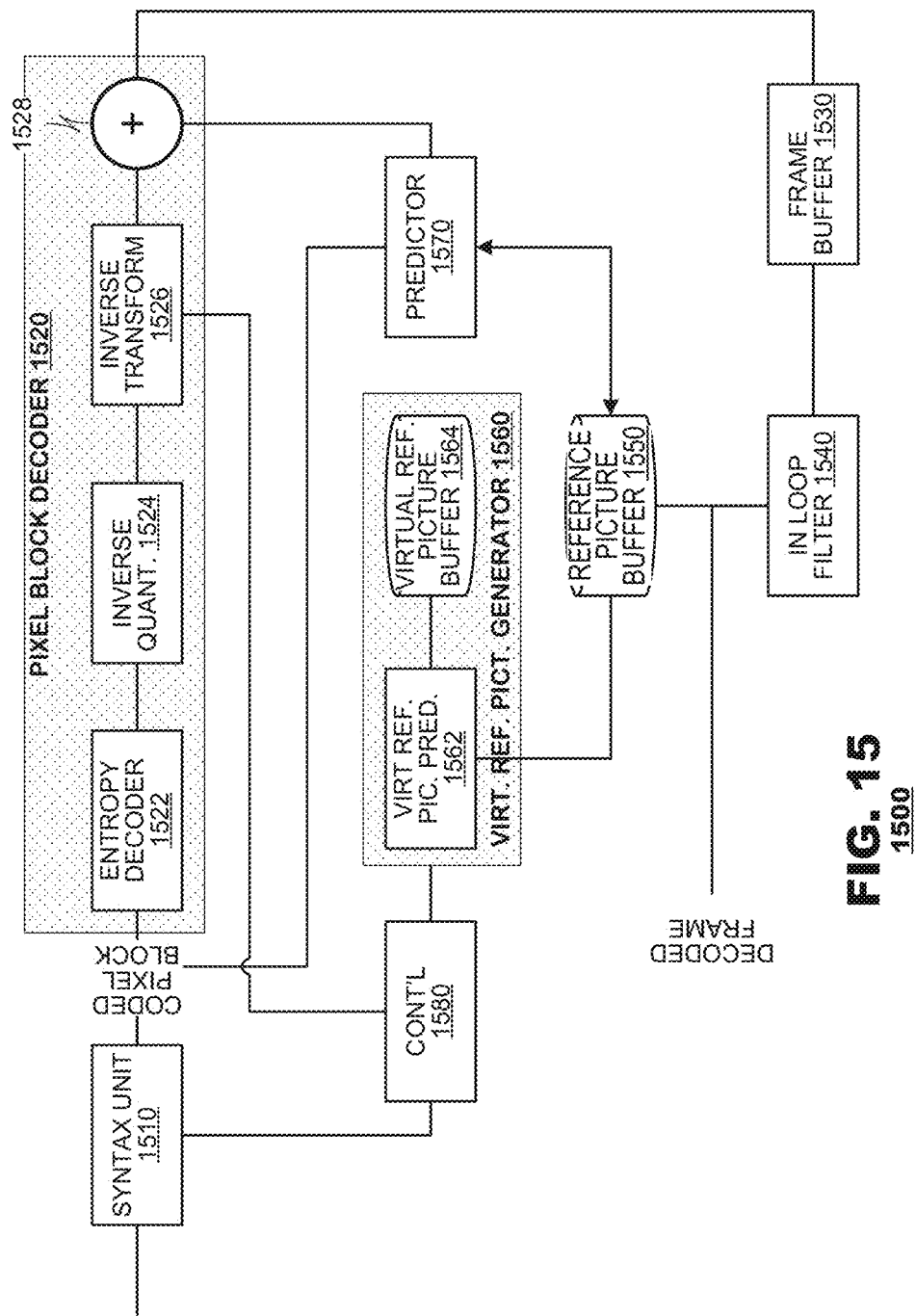
FIG. 15 is a block diagram of a video decoder according to embodiments of the present disclosure.

FIG. 15 is a functional block diagram of a decoding system 1500 according to an aspect of the present disclosure. The decoding system 1500 may include a syntax unit 1510, a coding block decoder 1520, a frame buffer 1530, an in-loop filter 1540, a reference picture buffer 1550, a virtual reference picture generator 1560, a predictor 1570, and a controller 1580.

The syntax unit 1510 may receive a coded video data stream and may parse the coded data into its constituent parts. Data representing coding parameters may be furnished to the controller 1580, while data representing coded residuals (the data output by the coding block coder 1410 of FIG. 14) may be furnished to the coding block decoder 1520. The predictor 1570 may generate a prediction block from reference frame data available in the reference picture buffer 1550 or the virtual reference picture generator 1560 as determined by coding parameter data provided in the coded video. The predictor 1570 may supply the prediction block to the coding block decoder 1520.

The coding block decoder 1520 may invert coding operations applied by the coding block coder 1410 (FIG. 14). The frame buffer 1530 may create a reconstructed frame from decoded coding blocks output by the coding block decoder 1520. The in-loop filter 1540 may filter the reconstructed frame data. The filtered frames may be output from the decoding system 1500. Filtered frames that are designated to serve as reference frames also may be stored in the reference picture buffer 1550.

The coding block decoder 1520 may include an entropy decoder 1522, a dequantizer 1524, an inverse transform unit 1526, and an adder 1528. The entropy decoder 1522 may perform entropy decoding to invert processes performed by the entropy coder 1418 (FIG. 14). The dequantizer 1524 may invert operations of the quantizer 1416 of the coding block coder 1410 (FIG. 14). Similarly, the inverse transform unit 1526 may invert operations of the transform unit 1414 (FIG. 14). They may use the quantization parameters and transform modes that are identified by the encoder either expressly or impliedly. Because quantization is likely to truncate data, the coding blocks recovered by the dequantizer 1524 likely will possess coding errors when compared to the input coding blocks s presented to the coding block coder 1410 of the encoder (FIG. 14).

The adder 1528 may invert operations performed by the subtractor 1412 (FIG. 14). It may receive a prediction coding block from the predictor 1570 as determined by prediction references in the coded video data stream. The adder 1528 may add the prediction coding block to reconstructed residual values output by the inverse transform unit 1526 and may output reconstructed coding block data.

As described, the frame buffer 1530 may assemble a reconstructed frame from the output of the coding block decoder 1520. The in-loop filter 1540 may perform various filtering operations on recovered coding block data as identified by the coded video data. For example, the in-loop filter 1540 may include a deblocking filter, a sample adaptive offset ("SAO") filter, and/or other types of in loop filters. In this manner, operation of the frame buffer 1530 and the in loop filter 1540 mimic operation of the counterpart frame buffer 1430 and in loop filter 1440 of the encoder 1400 (FIG. 14).

The reference picture buffer 1550 may store filtered frame data for use in later prediction of other coding blocks. The reference picture buffer 1550 may store decoded frames as it is coded for use in intra prediction. The reference picture buffer 1550 also may store decoded reference frames.

The virtual reference picture generator 1560 may generate virtual reference frames. The virtual reference picture generator 1560 may include a virtual reference picture predictor 1562 and a virtual reference picture buffer 1564. The virtual reference picture predictor 1562 may generate the virtual reference frames from reference frames stored in the reference picture buffer 1550. The virtual reference picture buffer 1564 may store the virtual reference frames so generated for use in prediction by the predictor 1570.

When performing prediction searches within virtual reference frames stored in the virtual reference frame buffer 1564, the predictor 1570 may perform direct motion projection and temporal motion projection as described hereinabove.

As discussed, the predictor 1570 may supply the prediction blocks to the coding block decoder 1520 according to a coding mode identified in the coded video data. The predictor 1570 may supply predicted coding block data as determined by the prediction reference indicators supplied in the coded video data stream.

The controller 1580 may control overall operation of the coding system 1500. The controller 1580 may set operational parameters for the coding block decoder 1520 and the predictor 1570 based on parameters received in the coded video data stream. As is relevant to the present discussion, these operational parameters may include quantization parameters for the dequantizer 1524 and transform modes for the inverse transform unit 1510. As discussed, the received parameters may be set at various granularities of image data, for example, on a per coding block basis, a per frame basis, a per slice basis, a per LCU/CTU basis, or based on other types of regions defined for the input image.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically are stored in physical storage media such as electronic-, magnetic-, and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A video decoding method, comprising:
identifying, from a transform set processing context, a transform set to be used for decoding a transform unit, the transform set selected from a hierarchy of transform sets, wherein each transform set includes a respective number of transforms and each higher-level transform set of the hierarchy includes the transforms of each lower-level transform set of the hierarchy;
identifying, from a candidate transform processing context, a transform from the identified transform set to be used for decoding a coded block, and
decoding the coded block according to the identified transform.

2. The method of claim 1, wherein a lowest-level transform set has a single transform.

3. The method of claim 1, wherein a highest-level transform set has all transforms supported by a coding protocol in which the method operates.

4. The method of claim 1, wherein there are a plurality of transform set hierarchies each corresponding to a different transform unit configuration.

5. The method of claim 1, wherein the coded block is a coded transform unit.

6. The method of claim 1, wherein the transform set processing context includes a prediction mode of the coded block.

7. The method of claim 1, wherein the transform set processing context includes a size of the coded block.

8. The method of claim 1, wherein the transform set processing context includes a shape of the coded block.

9. The method of claim 1, wherein the transform set processing context includes a color component to which the coded block belongs.

10. The method of claim 1, wherein the transform set processing context includes a last coefficient position of the coded block.

11. The method of claim 1, wherein the transform set processing context includes a transform set of a previously-decoded block.

12. The method of claim 1, wherein the transform set processing context includes a default transform set identified in coded video data.

13. The method of claim 1, wherein the transform set processing context includes a transform set indicator, provided in coded video data, of the transform set.

14. The method of claim 13, wherein the transform set indicator is provided in a syntax element of a coding protocol corresponding to a transform unit.

15. The method of claim 13, wherein the transform set indicator is provided in a syntax element of a coding protocol corresponding to a coding unit.

16. The method of claim 13, wherein the transform set indicator is provided in a syntax element of a coding protocol corresponding to a prediction unit.

17. The method of claim 13, wherein the transform set indicator is provided in a syntax element of a coding protocol corresponding to a tile.

18. The method of claim 13, wherein the transform set indicator is provided in a syntax element of a coding protocol corresponding to a sequence parameter set.

19. The method of claim 13, wherein the transform set indicator is provided in a syntax element of a coding protocol corresponding to a picture parameter set.

20. The method of claim 13, wherein the transform set indicator is provided in a tx_set syntax element.

21. The method of claim 20, wherein the identified transform is identified by a mapping table indexed by the transform set indicator.

22. The method of claim 1, wherein, when the transform set has a single entry, the transform is identified as a transform corresponding to the single entry.

23. The method of claim 1, wherein, when the transform set has multiple entries, a transform indicator is provided in the coded video data.

24. The method of claim 23, wherein the transform indicator is entropy coded according to an entropy coding context model.

25. The method of claim 24, wherein, the entropy coding context includes a prediction mode of the coded block.

26. The method of claim 24, wherein the entropy coding context includes a size of the coded block.

27. The method of claim 24, wherein the entropy coding context includes a shape of the coded block.

28. The method of claim 24, wherein the entropy coding context elements are defined by elements of the transform processing context.

29. The method of claim 24, wherein the entropy coding context elements are defined by at least one element in the transform processing context.

30. The method of claim 1, wherein, when the transform set has multiple entries, the candidate transform processing context determines an order of transform candidates from which the transform is selected.

31. The method of claim 1, wherein, when the transform set has multiple entries, the candidate transform processing context disables dependency rules associated with the transform set decoding context.

32. A video decoder, comprising:
a processing device,
a memory storing program instructions that, when executed by the processing device, cause the processing device to decode coded video by:
identifying, from a transform set processing context, a transform set to be used for decoding a transform unit of the coded video, the transform set selected from a hierarchy of transform sets, wherein each transform set includes a respective number of transforms and each higher-level transform set of the hierarchy includes the transforms of each lower-level transform set of the hierarchy;
identifying, from a candidate transform processing context, a transform from the identified transform set to be used for decoding the transform unit, and
decoding the transform unit according to the identified transform.

33. A video coding method, comprising:
identifying a transform set to be used for coding a transform unit, the transform set selected from a hierarchy of transform sets, wherein each transform set includes a respective number of transforms and each higher-level transform set of the hierarchy includes the transforms of each lower-level transform set of the hierarchy;
identifying a transform from the identified transform set to be used for coding the transform unit;
coding the transform unit according to the identified transform; and
transmitting, to a channel, transform set context data, transform context data, and coded data of the transform unit.

34. The method of claim 33, wherein a lowest-level transform set has a single transform.

35. The method of claim 33, wherein a highest-level transform set has all transforms supported by a coding protocol in which the method operates.

36. The method of claim 33, wherein there are a plurality of transform set hierarchies each corresponding to a different transform unit configuration.

37. A video coder, comprising:
a processing device,
a memory storing program instructions that, when executed by the processing device, cause the processing device to code input video by:
identifying a transform set to be used for coding a transform unit of the input video, the transform set selected from a hierarchy of transform sets, wherein each transform set includes a respective number of transforms and each higher-level transform set of the hierarchy includes the transforms of each lower-level transform set of the hierarchy;
identifying a transform from the identified transform set to be used for coding the transform unit;
coding the transform unit according to the identified transform; and
transmitting, to a channel, transform set context data, transform context data, and coded data of the transform unit.

* * * * *